United States Patent
Stanciu et al.

(10) Patent No.: US 9,850,424 B2
(45) Date of Patent: Dec. 26, 2017

(54) SILANE COMPOSITIONS FOR USE IN SUBTERRANEAN FORMATION OPERATIONS

(71) Applicant: Halliburton Energy Services, Inc., Houston, TX (US)

(72) Inventors: Corneliu Stanciu, Kingwood, TX (US); James Ogle, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 73 days.

(21) Appl. No.: 14/439,004

(22) PCT Filed: Jun. 18, 2014

(86) PCT No.: PCT/US2014/042857
§ 371 (c)(1),
(2) Date: Apr. 28, 2015

(87) PCT Pub. No.: WO2015/195107
PCT Pub. Date: Dec. 23, 2015

(65) Prior Publication Data
US 2016/0289551 A1    Oct. 6, 2016

(51) Int. Cl.
*E21B 43/267* (2006.01)
*C09K 8/80* (2006.01)
(Continued)

(52) U.S. Cl.
CPC .............. *C09K 8/805* (2013.01); *C09K 8/035* (2013.01); *C09K 8/56* (2013.01); *C09K 8/565* (2013.01);
(Continued)

(58) Field of Classification Search
CPC .................................................. C09K 8/5751
See application file for complete search history.

(56) References Cited

U.S. PATENT DOCUMENTS 5,069,971 A * 12/1991 Waketa .................. C03C 25/40
428/391
5,775,425 A    7/1998 Weaver et al.
(Continued)

FOREIGN PATENT DOCUMENTS

WO    2015195107 A1    12/2015

OTHER PUBLICATIONS

International Search Report and Written Opinion for PCT/US2014/042857 dated Feb. 13, 2015.

*Primary Examiner* — Doug Hutton, Jr.
*Assistant Examiner* — Charles Nold
(74) *Attorney, Agent, or Firm* — McDermott Will & Emery LLP

(57) ABSTRACT

Methods including providing a silane composition selected from the group consisting of a dipodal silane, a long-chain silane, and any combination thereof, wherein the dipodal silane includes at least two carbon chains having between about 2 and about 36 carbon atoms, and wherein the long-chain silane includes at least one carbon chain having between about 2 and about 36 carbon atoms; coating proppant particulates with the silane composition, thereby forming silane composition coated proppant particulates; and introducing the silane composition coated proppant particulates into at least one fracture in a subterranean formation, thereby stabilizing loose particulates therein.

16 Claims, 1 Drawing Sheet

(51) Int. Cl.
  *C09K 8/035* (2006.01)
  *C09K 8/565* (2006.01)
  *C09K 8/575* (2006.01)
  *C09K 8/56* (2006.01)
  *E21B 43/04* (2006.01)

(52) U.S. Cl.
  CPC .......... *C09K 8/5751* (2013.01); *E21B 43/267* (2013.01); *E21B 43/04* (2013.01)

(56) References Cited

U.S. PATENT DOCUMENTS

| | | |
|---|---|---|
| 6,047,772 A | 4/2000 | Weaver et al. |
| 6,129,986 A * | 10/2000 | Bessho .................. C09K 11/02 252/301.35 |
| 6,447,589 B2 * | 9/2002 | Sasaki .................. C08G 83/001 106/14.05 |
| 6,832,650 B2 | 12/2004 | Nguyen et al. |
| 6,892,813 B2 | 5/2005 | Nguyen et al. |
| 6,962,200 B2 | 11/2005 | Nguyen et al. |
| 7,104,325 B2 | 9/2006 | Nguyen et al. |
| 7,114,570 B2 | 10/2006 | Nguyen et al. |
| 7,306,037 B2 | 12/2007 | Nguyen et al. |
| 8,261,833 B2 | 9/2012 | Nguyen et al. |
| 2003/0138715 A1 * | 7/2003 | Barthel ................... C01B 33/18 430/108.3 |
| 2011/0017461 A1 * | 1/2011 | Aston .................... C09K 8/565 166/310 |
| 2014/0076558 A1 | 3/2014 | Nguyen et al. |
| 2014/0162911 A1 | 6/2014 | Monastiriotis et al. |
| 2014/0338906 A1 * | 11/2014 | Monastiriotis ......... C09K 8/805 166/280.2 |

\* cited by examiner

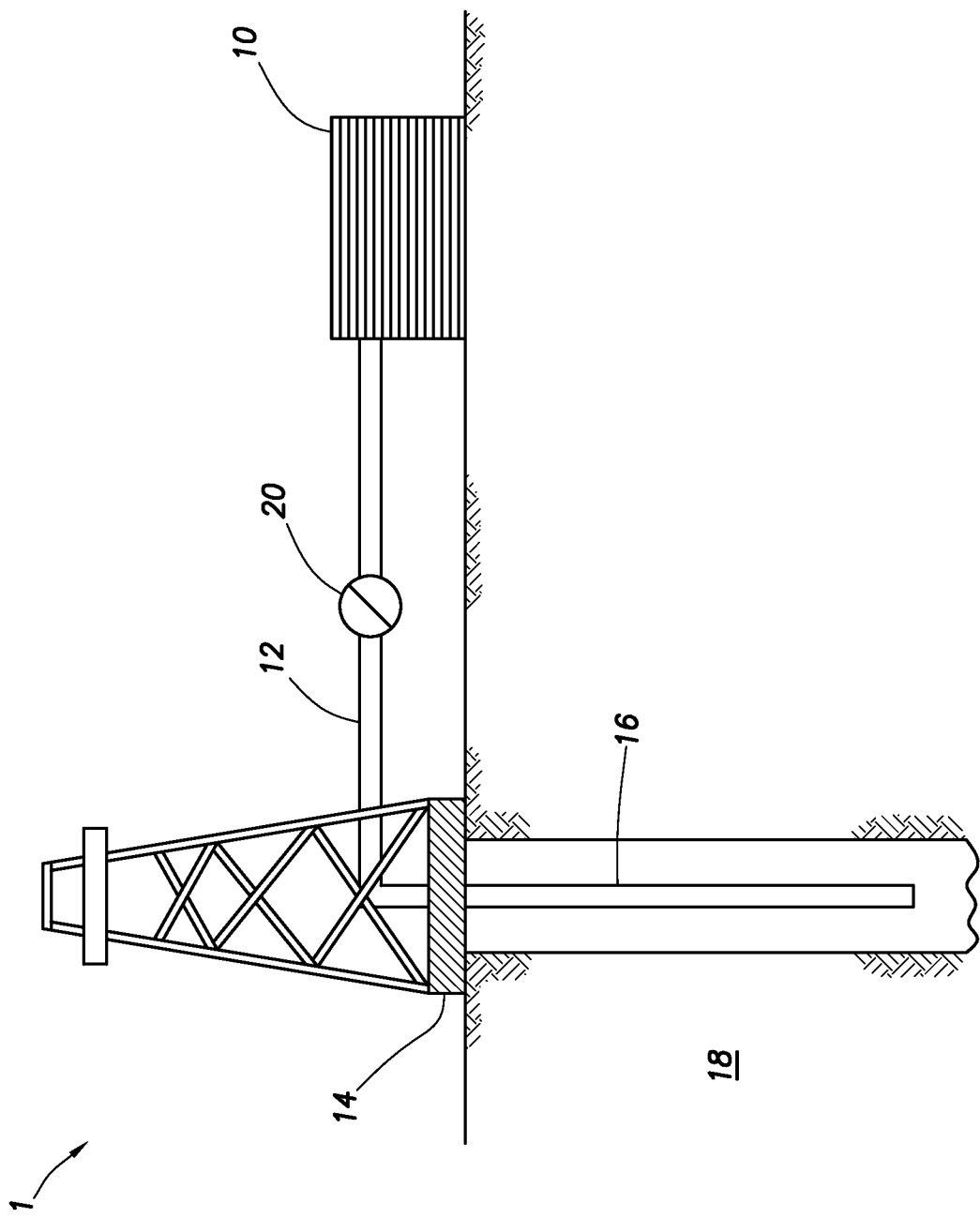

SILANE COMPOSITIONS FOR USE IN SUBTERRANEAN FORMATION OPERATIONS

BACKGROUND

The embodiments herein relate to silane compositions for use in subterranean formation operations and, in particular, to silane compositions comprising one or two silicon atoms having carbon chain lengths of between 2 and 36 carbon atoms. The silane compositions are capable of stabilizing loose particulates in the subterranean formation.

Hydrocarbon wells are often at least partially located in unconsolidated portions of a subterranean formation. As used herein, the term "unconsolidated portion of a subterranean formation," and grammatical variants thereof, refers to a portion of a subterranean formation that comprises loose particulate matter (e.g., formation fines, proppant, other introduced particulates, such as diverting agents, and the like) that can migrate out of the formation with, among other things, the oil, gas, water, and/or other fluids recovered out of the well. The particulate material in a relatively unconsolidated portion of a subterranean formation may be readily entrained by recovered fluids, for example, wherein the particulates in that portion of the subterranean formation are bonded together with insufficient bond strength to withstand the forces produced by the production of fluids through those regions of the formation. The presence of particulate matter in the recovered fluids may be undesirable in that the produced particulates may abrade pumping and other producing equipment, reduce the fluid production capabilities of certain portions of the subterranean formation, require costly cleaning operations to remove the particulate matter from the recovered fluids, and the like. In addition, the particulate material may block the pore throats of a subterranean formation, thereby reducing the permeability of the formation (i.e., the ability of the formation to transmit fluid for recovery).

One approach to prevent or reduce the particulates from being produced with the formation fluids is the use of a gravel packing treatment. In a typical gravel packing treatment, one or more screens are mounted on a wellbore tubular and positioned in a wellbore drilled through a subterranean formation adjacent a desired production interval. An annulus is formed between the subterranean formation and the wellbore tubular. Specifically sized particulate material, referred to herein collectively as "gravel," is pumped as a slurry through the wellbore tubular and into the annulus. The gravel is deposited into the annulus around the screen and tightly packed therein to form a "gravel pack." The gravel is sized such that it forms a permeable mass that allows formation fluids therethrough but at least partially prevents or blocks the flow of loose particulates with the formation fluids. However, loose particulates may still escape the confines of the gravel pack and flow into the wellbore opening, limiting drawdown pressure. This may be particularly true if the loose particulates have a particularly broad size distribution, such that the gravel pack is not capable of preventing all of the particulates from migrating through the pack.

Another method used to mitigate the migration of particulates in subterranean formations involves adhering the particulates together in an area of interest in the subterranean formation, which is usually accomplished by treating the particulates with a traditional consolidation system, typically having a resin, and optionally, depending on the resin type, a coupling agent and/or a hardening agent. Consolidation treatments generally involve coating a resin around the surface of a loose particulate in a formation that, when cured, holds the particulate in place in the formation and prevents or reduces its migration therein. However, coating of loose particulates with traditional consolidation systems to prevent their migration in a formation may undesirably result in a reduction in the diameter (i.e., at least partial blockage) of the pore throats of the formation, thereby reducing the permeability of the formation. Accordingly, the productivity of the formation may be reduced by the resin treatment. Additionally, the resin may not have any particular affinity for the loose particulates as compared to other portions of the formation and so may fail to adequately coat the undesired particulates to prevent their migration. Traditional consolidation treatments also generally form hardened masses to prevent particulate migration and so may fail to reduce entrainment of newly formed particulate material or particulate matter that was not consolidated in place with produced fluids.

BRIEF DESCRIPTION OF THE DRAWINGS

The following FIGURES are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 shows an illustrative schematic of a system for delivering the silane compositions described herein to a downhole location, according to one or more embodiments.

DETAILED DESCRIPTION

The embodiments herein relate to silane compositions for use in subterranean formation operations and, in particular, to silane compositions comprising one or two silicon atoms having carbon chain lengths of between 2 and 36 carbon atoms. The silane compositions are capable of stabilizing loose particulates in the subterranean formation.

The silane compositions of the present disclosure are capable of self-adhering to loose organic or inorganic particulates, such as formation fines and/or proppant, such as by reacting a functional group on the silane composition with the hydroxyl groups of such particulates, thereby coupling the saline composition to the particulates by hydrolytic deposition (i.e., a condensation reaction). For example, in one embodiment, the silane composition may comprise a $Si(OMe)_3$ functional group, which may react with hydroxyl groups on the surface of the loose particulates, thereby displacing and eliminating methanol and forming the covalent siloxane bond Si—O—Si. As used herein, the terms "loose particulates" or "unconsolidated particulates," and all of their grammatical variants, refer to any free or moveable particulate (e.g., those having insufficient bond strength to withstand formation forces) in a subterranean formation, whether naturally therein or placed therein. Such loose particulates may include, for example, proppant particulates, formation fines, and the like. As used herein, the term "formation fines" may refer to any loose particulates that have sloughed off a subterranean formation including, for example, particulate clays, sand, sandstones, carbonates, limestones, coal beds, shales, diatomites, chalk, siltstones, gravel, pebbles, dolostones, mudstones, volcanic rock, and the like.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having the benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

Silane compositions suitable for use in the present invention include molecules with one or two silicon atoms and having carbon chains with between 2 and 36 carbon atoms. That is, a suitable silane composition may be a dipodal silane (a compound having two silicon atoms) with at least two carbon chains having between about 2 and about 36 carbon atoms. Another suitable silane composition may be a long-chain silane, which herein refers to a molecule having one silicon atom and a carbon chain having between 2 and 36 carbon atoms. The silane composition may be coated onto proppant particulates by the reaction described above, for example, thereby forming silane composition coated proppant particulates. Thereafter, the silane composition coated proppant particulates may be introduced into a subterranean formation having at least one fracture and loose particulates therein. The silane composition coated proppant particulates may be placed into the at least one fracture and therein stabilize the loose particulates. The silane composition proppant particulates may form a proppant pack in the at least one fracture. As used herein, the term "proppant pack," and any grammatical variant thereof, refers to a collection of proppant particulates within a fracture that prop open the fracture for formation fluids (e.g., produced hydrocarbon fluids) to flow therethrough. In some embodiments, the silane composition coated onto the proppant particulates may serve to stabilize the proppant particulates themselves from substantial migration from the fracture or proppant pack.

In some embodiments, the proppant particulates may be pre-coated prior to reaching the jobsite, may be coated at the jobsite, or may be coated on-the-fly. As used herein, the term "on-the-fly," refers to performing an operation during a subterranean treatment that does not require stopping normal operations. For example, in some embodiments, the proppant particulates and the silane composition(s) may be mixed together and the silane composition may adhere or otherwise react to coat the proppant particulates. In other embodiments, the silane composition and/or the proppant particulates may be placed in a treatment fluid, such as during introduction into a subterranean formation, where the silane composition and the proppant particulates interact in the treatment fluid such that the silane composition adheres or otherwise reacts with the proppant particulates to form a coating thereon.

In other embodiments, the present disclosure provides a method comprising providing a silane composition comprising at least one of a silane composition. The silane composition may be selected from the group consisting of a dipodal silane, a long-chain silane, and any combination thereof. The dipodal silane may include at least two carbon chains having between about 2 and about 36 carbon atoms and the long-chain silane may include at least one carbon chain having between 2 and 36 carbon atoms. The silane composition may then be introduced into a subterranean formation having at least one fracture therein, and the silane composition(s) may be coated onto at least one of a face of the subterranean formation and the fracture therein, thereby stabilizing loose particulates forming part of the formation or in the fracture.

In some embodiments, the carbon chain(s) on the silane composition (collectively referred to herein to encompass both the dipodal silane and the long-chain silane) may comprise between about 2 and about 36 carbon atoms. In other embodiments, the carbon chain(s) on the silane composition(s) may comprise between about 8 and about 18 carbons, or about 3 and about 16 carbons. In some preferred embodiments, the at least two carbon chains of the dipodal silane composition have between about 8 and about 18 carbon atoms. In some preferred embodiments, the at least one carbon chain of the long-chain silane composition has between about 3 and about 16 carbon atoms. In some embodiments one or more of the carbon atoms may be substituted with a heteroatom. As used herein, the term "heteroatom" refers to an atom in the ring of a cyclic compound other than a carbon atom. Additionally, the carbon chain(s) on the silane compositions described herein may be one or more of a branched residue (i.e., having side groups) or a linear residue, and any combination thereof.

In some embodiments, additional carbon chains may be bonded to the one or more silicon atom of the silane composition. In such embodiments, the carbon chain may have between 1 and 4 carbon atoms, for example (e.g., methyl, ethyl, propyl, isopropyl, butyl, isobutyl groups). Bis- and tris-species of these carbon chains may also be present, without departing from the scope of the present invention.

The silane compositions of the present disclosure provide a strong covalent bond with the proppant particulates and/or formation face of a subterranean formation, while also being capable of trapping formation fines and prevent or reduce their migration within the formation. The dipodal silane may provide superior bonding with the proppant particulates and/or formation face due to the presence of the presence of dual covalent bonds. Furthermore, such covalent bonding prevents or reduces the susceptibility of the silane composition to dissociate with the proppant particulates and/or formation face when exposed to hydrocarbons, such as during production of the formation. The carbon chains on the silane compositions described herein may be preferentially long in order to enhance the ability of the silane composition to trap or entangle formation fines and hold them in place. Due to these benefits, substantially less of the silane composition is required, as compared to traditional stabilizing compositions. Moreover, no additional resin is required to provide stabilization of the formation fines. Accordingly, only a single component is required for stabilization of formation fines, translating into decreased cost and operator time at the jobsite to perform a stabilization operation; similarly, less storage space, and the like, is required to maintain a supply of the silane compositions of the present disclosure.

Additionally, the silane compositions of the present disclosure are not tacky. As used herein, the term "tacky" refers to a substance that is somewhat sticky to the touch. As such, there is no risk that the silane compositions will adhere or otherwise become stuck in equipment crevasses, equipment tubulars, or unwanted areas in the formation itself.

In some embodiments, the silane composition present in the silane compositions described herein may be a dipodal silane composition. Examples of specific dipodal silane compositions that may be used in accordance with the following disclosure may include, but are not limited to, the following compounds:

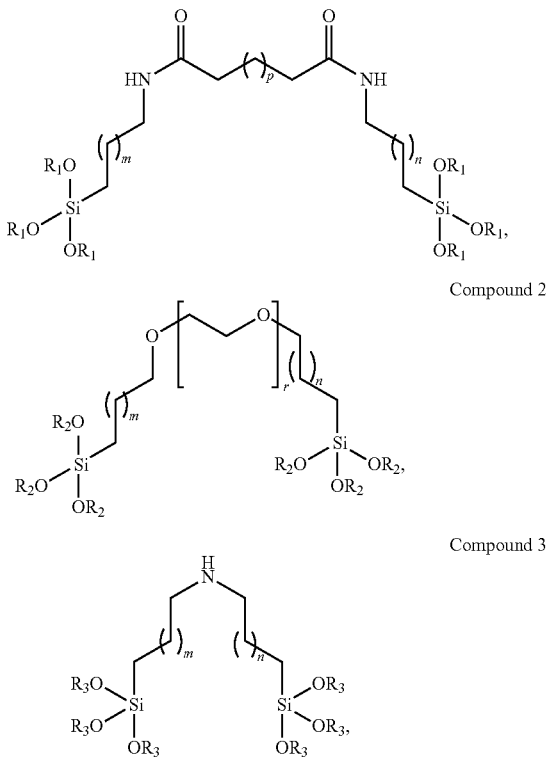

Compound 1

Compound 2

Compound 3

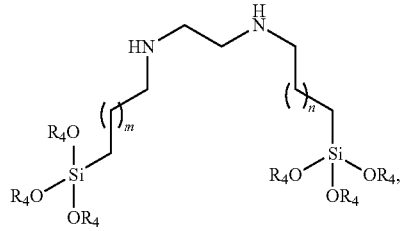

Compound 4 any derivatives thereof, and any combination thereof, wherein p and r are integers between about 1 and about 30; wherein m and n are carbon chains having between about 2 and about 36 carbon atoms; and wherein $R_1$ through $R_4$ are carbon chains having between about 1 and about 4 carbon atoms, including bis- and tris-species thereof.

In some embodiments, Compounds 3 and 4 may further comprise a substitution of a secondary amine nitrogen with a carbon chain. In some embodiments, m and n are carbon chains comprising between about 2 and about 36 carbon atoms, between about 8 and about 18 carbons, or about 3 and about 16 carbons. In some embodiments, $R_3$ on Compound 3 is preferentially an ethyl group.

In other embodiments, the silane composition may be a long-chain silane composition capable of controlling formation fines migration in a subterranean formation. An example of a suitable long-chain silane composition may include, but is not limited to, the following compound:

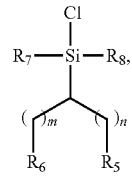

Compound 5 and any derivative thereof, wherein m and n are carbon chains having between about 2 and about 36 carbon atoms; and $R_5$ through $R_8$ are carbon chains having between about 1 and about 4 carbon atoms. In some preferred embodiments, in Compound 5, n has 11 carbon atoms, m has 10 carbon atoms, $R_6$ has 1 carbon atom, and $R_5$ through $R_8$ are methyl groups, including bis- and tris-species thereof.

In some embodiments, where the silane compositions and/or proppant particulates coated with the silane compositions are included in a treatment fluid, such treatment fluids may include, but are not limited to, oil-based fluids, aqueous-based fluids, aqueous-miscible fluids, water-in-oil emulsions, or oil-in-water emulsions. Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. It should be noted that for water-in-oil and oil-in-water emulsions, any mixture of the above may be used including the water being and/or comprising an aqueous-miscible fluid.

In some embodiments, the treatment fluid comprising the silane composition may further comprise an additive including, but not limited to, a salt, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

In various embodiments, systems may be configured for delivering the silane compositions in any form described herein (e.g., alone, diluted in a treatment fluid, coated onto a particulate, and the like) to a downhole location. In various embodiments, the systems can comprise a pump fluidly coupled to a tubular, the tubular containing the silane compositions. The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the silane compositions to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the silane compositions to the high pressure pump. In such embodiments, the low pressure pump may "step up" the pressure of the silane compositions before it reaches the high pressure pump.

In some embodiments, the systems described herein can further comprise a mixing tank that is upstream of the pump and in which the silane composition is formulated. In various embodiments, the pump (e.g., a low pressure pump, a high pressure pump, or a combination thereof) may convey the silane compositions from the mixing tank or other source of the silane compositions to the tubular. In other embodiments, however, the silane compositions can be formulated offsite and transported to a worksite, in which case the silane compositions may be introduced to the tubular via the pump directly from its shipping container (e.g., a truck, a railcar, a barge, or the like) or from a transport pipeline. In either case, the silane compositions may be drawn into the pump, elevated to an appropriate pressure, and then introduced into the tubular for delivery downhole.

FIG. 1 shows an illustrative schematic of a system that can deliver silane compositions of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a silane composition of the present disclosure may be formulated. The silane compositions may be conveyed via line 12 to wellhead 14, where the silane compositions enter tubular 16, tubular 16 extending from wellhead 14 into subterranean 18. Upon being ejected from tubular 16, the silane compositions may subsequently penetrate into subterranean formation 18. In some instances, tubular 16 may have a plurality of orifices (not shown) through which the silane compositions of the present disclosure may enter the wellbore proximal to a portion of the subterranean formation 18 to be treated. In some instances, the wellbore may further comprise equipment or tools (not shown) for zonal isolation of a portion of the subterranean formation 18 to be treated.

Pump 20 may be configured to raise the pressure of the silane compositions to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the silane compositions may, in some embodiments, flow back to wellhead 14 and exit subterranean formation 18. In some embodiments, the silane composition that has flowed back to wellhead 14 may subsequently be recovered and recirculated to subterranean formation 18.

It is also to be recognized that the disclosed silane compositions may also directly or indirectly affect the various downhole equipment and tools that may come into contact with the silane compositions during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include Embodiment A, Embodiment B, and Embodiment C:

Embodiment A

A method comprising: providing a silane composition selected from the group consisting of a dipodal silane, a long-chain silane, and any combination thereof, wherein the dipodal silane includes at least two carbon chains having between about 2 and about 36 carbon atoms, and wherein the long-chain silane includes at least one carbon chain having between about 2 and about 36 carbon atoms; coating proppant particulates with the silane composition, thereby forming silane composition coated proppant particulates; and introducing the silane composition coated proppant particulates into at least one fracture in a subterranean formation, thereby stabilizing loose particulates therein.

Embodiment B

A method comprising: providing a silane composition selected from the group consisting of a dipodal silane, a long-chain silane, and any combination thereof, wherein the dipodal silane includes at least two carbon chains having between about 2 and about 36 carbon atoms, and wherein the long-chain silane includes at least one carbon chain having between about 2 and about 36 carbon atoms; introducing the silane composition into a subterranean formation having at least one fracture therein; and coating the silane composition on at least one of a face of the subterranean formation and the fracture therein, thereby stabilizing loose particulates therein.

Embodiment C

A system comprising: a wellhead with a tubular extending therefrom and into a subterranean formation, having a pump fluidly coupled to the tubular; and introducing a silane composition into the subterranean formation through the tubular, wherein the silane composition is selected from the group consisting of a dipodal silane, a long-chain silane, and any combination thereof, wherein the dipodal silane includes at least two carbon chains having between about 2 and about 36 carbon atoms, and wherein the long-chain silane includes at least one carbon chain having between about 2 and about 36 carbon atoms.

Each of Embodiments A, B, and C may have one or more of the following additional elements in any combination:

Element 1: Wherein the carbon chains of the dipodal silane and/or the long-chain silane are selected from the group consisting of a branched residue, a linear residue, and any combination thereof.

Element 2: Wherein the at least two carbon chains of the dipodal silane have between about 8 and about 18 carbon atoms.

Element 3: Wherein the at least one carbon chain of the long-chain silane has between about 3 and about 16 carbon atoms.

Element 4: Wherein the dipodal silane is selected from the group consisting of:

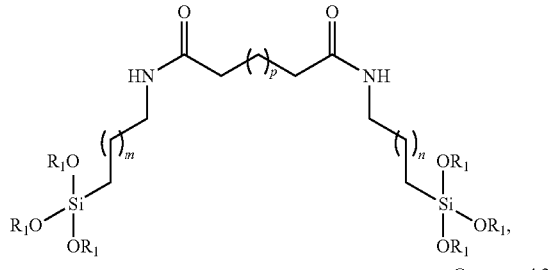

Compound 1

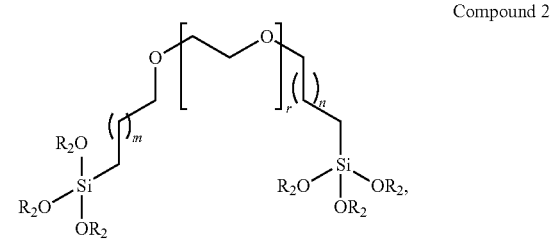

Compound 2

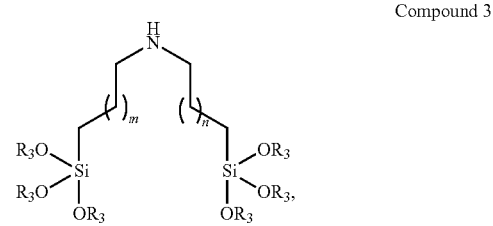

Compound 3

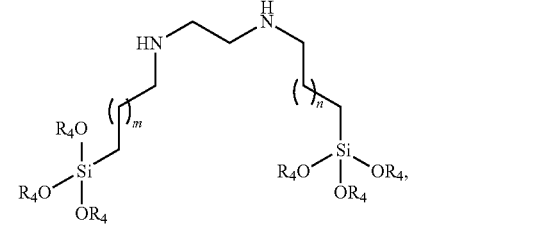

Compound 4 any derivatives thereof, and any combination thereof, wherein p and r are integers between about 1 and about 30; wherein m and n are carbon chains having between about 2 and about 36 carbon atoms; and wherein $R_1$ through $R_4$ are carbon chains having between about 1 and about 4 carbon atoms, including bis- and tris-species thereof.

Element 5: Wherein the silane composition comprises Compound 3, Compound 3 further comprising a secondary amine nitrogen substitution with a carbon chain of between about 2 and about 36 carbon atoms.

Element 6: Wherein the silane composition comprises Compound 4, Compound 4 further comprising a secondary amine nitrogen substitution with a carbon chain of between about 2 and about 36 carbon atoms.

Element 7: Wherein the silane composition comprises Compound 3 and $R_3$ is an ethyl group.

Element 8: wherein the long-chain silane is represented by the Formula:

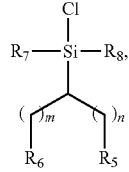

Compound 5 and any derivatives thereof, wherein m and n are carbon chains having between about 2 and about 36 carbon atoms; and $R_5$ through $R_8$ are carbon chains having between about 1 and about 4 carbon atoms, including bis- and tris-species thereof.

Element 9: Wherein n has 11 carbon atoms, m has 10 carbon atoms, $R_6$ has 1 carbon atom, and $R_5$ through $R_8$ are methyl groups.

By way of non-limiting example, exemplary combinations applicable to A, B, C include: A with 1, 8 and 9; A with 4 and 5; B with 2, 4, and 6; B with 1 and 8; C with 2, 4, and 7; C with 8 and 9.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   providing a silane composition selected from the group consisting of a dipodal silane, a long-chain silane, and any combination thereof,
   wherein the dipodal silane includes at least two carbon chains having between 8 and 36 carbon atoms and is selected from the group consisting of:

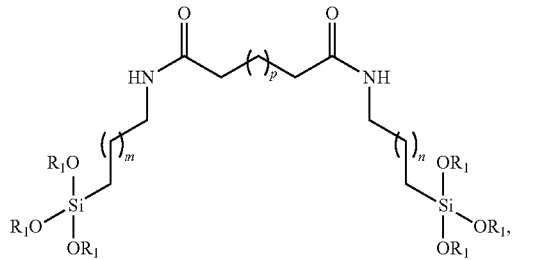

Compound 1

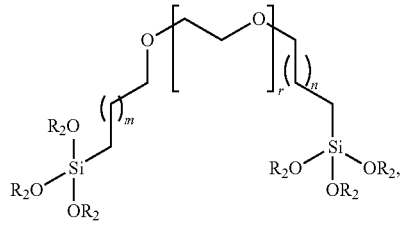

Compound 2

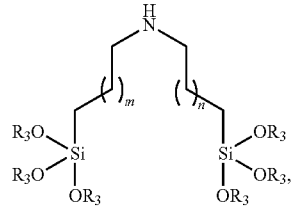

Compound 3

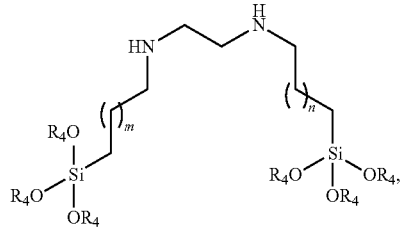

Compound 4 and any combination thereof,
   wherein p and r are integers between 1 and 30; wherein m and n are carbon chains having between 8 and 36 carbon atoms; and wherein $R_1$ through $R_4$ are carbon chains having between 1 and 4 carbon atoms, including bis- and tris-species thereof, and
   wherein the long-chain silane includes at least one carbon chain having between 8 and 36 carbon atoms and is represented by the Formula:

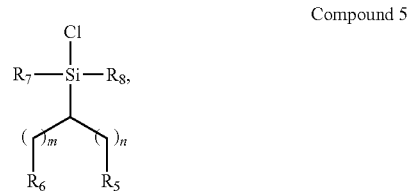

Compound 5 wherein m and n are carbon chains having between 8 and 36 carbon atoms, and $R_5$ through $R_8$ are carbon chains having between 1 and 4 carbon atoms, including bis- and tris-species thereof;

coating proppant particulates with the silane composition, thereby forming silane composition coated proppant particulates; and introducing the silane composition coated proppant particulates into at least one fracture in a subterranean formation, thereby stabilizing any loose particulates therein.

2. The method of claim 1, wherein the carbon chains of the dipodal silane and/or the long-chain silane are selected from the group consisting of a branched residue, a linear residue, and any combination thereof.

3. The method of claim 1, wherein the at least two carbon chains of the dipodal silane have between 8 and 18 carbon atoms.

4. The method of claim 1, wherein the at least one carbon chain of the long-chain silane has between 8 and 16 carbon atoms.

5. The method of claim 1, wherein the silane composition comprises Compound 3, Compound 3 further comprising a secondary amine nitrogen substitution with a carbon chain of between 8 and 36 carbon atoms.

6. The method of claim 1, wherein the silane composition comprises Compound 4, Compound 4 further comprising a secondary amine nitrogen substitution with a carbon chain of between 8 and 36 carbon atoms.

7. The method of claim 1, wherein the silane composition comprises Compound 3 and $R_3$ is an ethyl group.

8. The method of claim 1, wherein n has 11 carbon atoms, m has 10 carbon atoms, $R_6$ has 1 carbon atom, and $R_5$ through $R_5$ are methyl groups.

9. A method comprising:

providing a silane composition selected from the group consisting of a dipodal silane, a long-chain silane, and any combination thereof, wherein the dipodal silane includes at least two carbon chains having between 8 and 36 carbon atoms and is selected from the group consisting of:

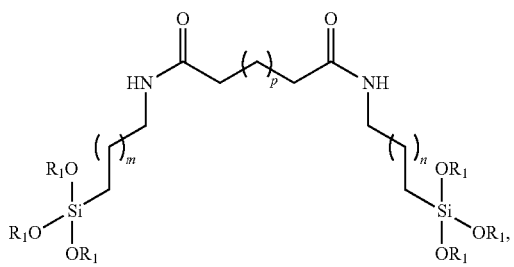

Compound 1

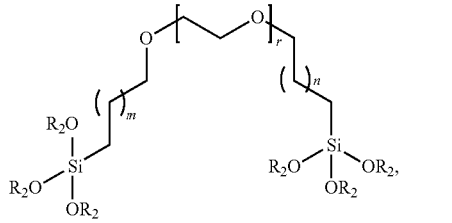

Compound 2

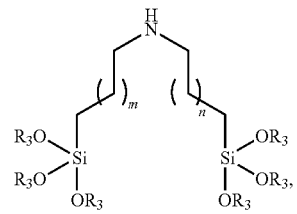

Compound 3

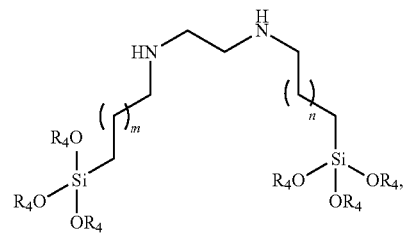

Compound 4 and any combination thereof, wherein p and r are integers between 1 and 30; wherein m and n are carbon chains having between 8 and 36 carbon atoms; and wherein $R_1$ through $R_4$ are carbon chains having between 1 and 4 carbon atoms, including bis- and tris-species thereof, and wherein the long-chain silane includes at least one carbon chain having between 8 and 36 carbon atoms and is represented by the Formula:

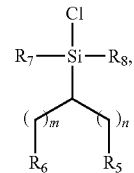

Compound 5 wherein m and n are carbon chains having between 8 and 36 carbon atoms; and $R_5$ through $R_8$ are carbon chains having between 1 and 4 carbon atoms, including bis- and tris-species thereof;

introducing the silane composition into a subterranean formation having at least one fracture therein; and coating the silane composition on at least one of a face of the subterranean formation and the fracture therein, thereby stabilizing any loose particulates therein.

10. The method of claim 9, wherein the at least two carbon chains of the dipodal silane have between 8 and 18 carbon atoms.

11. The method of claim 9, wherein the at least one carbon chain of the long-chain silane has between 8 and 16 carbon atoms.

12. The method of claim 9, wherein the silane composition comprises Compound 3, Compound 3 further comprising a secondary amine nitrogen substitution with a carbon chain of between 8 and 36 carbon atoms.

13. The method of claim 9, wherein the silane composition comprises Compound 4, Compound 4 further comprising a secondary amine nitrogen substitution with a carbon chain of between 8 and 36 carbon atoms.

14. The method of claim 9, wherein the silane composition comprises Compound 3 and $R_3$ is an ethyl group.

15. The method of claim 9, wherein n has 11 carbon atoms, m has 10 carbon atoms, $R_6$ has 1 carbon atom, and R5 through R8 are methyl groups.

16. A system comprising:
a wellhead with a tubular extending therefrom and into a subterranean formation, having a pump fluidly coupled to the tubular; and
introducing a silane composition into the subterranean formation through the tubular,
wherein the silane composition is selected from the group consisting of a dipodal silane, a long-chain silane, and any combination thereof,
wherein the dipodal silane includes at least two carbon chains having between 8 and 36 carbon atoms and is selected from the group consisting of:

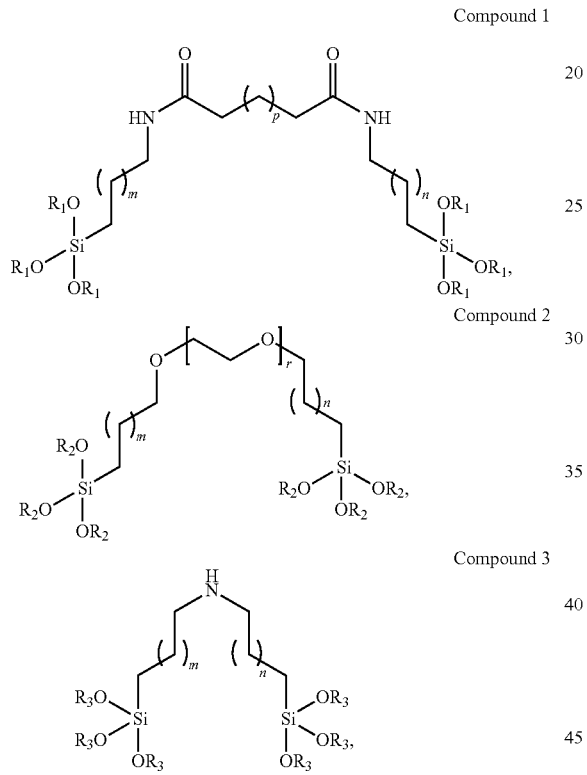

Compound 1

Compound 2

Compound 3

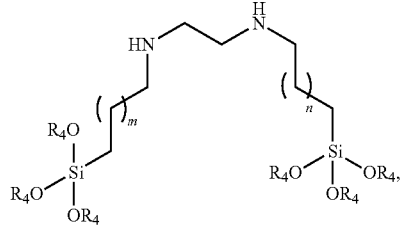

Compound 4 and any combination thereof,
wherein p and r are integers between 1 and 30; wherein m and n are carbon chains having between 8 and 36 carbon atoms; and wherein $R_1$ through $R_4$ are carbon chains having between 1 and 4 carbon atoms, including bis- and tris-species thereof, and
wherein the long-chain silane includes at least one carbon chain having between 8 and 36 carbon atoms and is represented by the Formula:

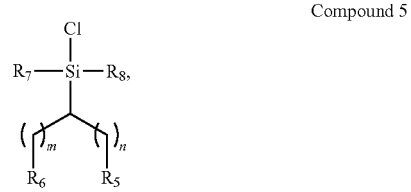

Compound 5 wherein m and n are carbon chains having between 8 and 36 carbon atoms; and $R_5$ through $R_8$ are carbon chains having between 1 and 4 carbon atoms, including bis- and tris-species thereof.

* * * * *